United States Patent [19]

Hayner

[11] Patent Number: 5,580,376
[45] Date of Patent: Dec. 3, 1996

[54] ASPHALT IMPROVEMENT

[75] Inventor: Roger E. Hayner, Russell, Ky.

[73] Assignee: Ashland Inc., Ashland, Ky.

[21] Appl. No.: 428,976

[22] Filed: Apr. 26, 1995

[51] Int. Cl.⁶ ................................................. C09D 195/00
[52] U.S. Cl. ................. 106/284.1; 427/138; 427/139; 404/72; 52/506.1; 52/515; 52/745.06; 52/746.11
[58] Field of Search .................. 106/284.1; 427/138, 427/139; 404/72; 52/506.1, 515, 745.06, 746.11

[56]  References Cited

U.S. PATENT DOCUMENTS

| | | | |
|---|---|---|---|
| 2,340,640 | 2/1944 | Burk | 106/273 |
| 2,492,994 | 1/1950 | Harman et al. | 106/273 |
| 2,508,432 | 5/1950 | Smith | 106/273 |
| 2,693,425 | 11/1954 | Hardman | 106/273 |
| 3,035,930 | 5/1962 | Talley | 106/273 |
| 3,650,785 | 3/1972 | Ball et al. | 106/90 |
| 3,751,278 | 8/1973 | Alexander | 106/273 |
| 3,920,467 | 11/1975 | Stewart | 106/273 |
| 4,002,412 | 1/1977 | Bennett et al. | 404/17 |
| 4,068,023 | 1/1978 | Nielsen et al. | 427/138 |
| 4,298,397 | 11/1981 | Burris | 106/274 |
| 4,645,538 | 2/1987 | Wright et al. | 106/273 |
| 4,677,146 | 6/1987 | Senz | 524/69 |
| 4,740,322 | 4/1988 | DiBiase et al. | 252/47.5 |
| 4,786,329 | 11/1988 | Chang et al. | 106/284 |
| 4,822,505 | 4/1989 | Alexander | 252/32.70 E |
| 4,833,184 | 5/1989 | Higgins | 524/60 |
| 4,889,880 | 12/1989 | Miller | 524/71 |
| 5,015,402 | 5/1991 | Yodice et al. | 252/32.7 |
| 5,037,474 | 8/1991 | Mesch et al. | 106/273.1 |
| 5,266,615 | 11/1993 | Omeis et al. | 524/69 |
| 5,284,509 | 2/1994 | Kamel et al. | 106/273.1 |

FOREIGN PATENT DOCUMENTS

| | | |
|---|---|---|
| 1849611 | 2/1975 | Japan . |
| 41379A23 | 4/1978 | Japan . |

OTHER PUBLICATIONS

Ind. Eng. Chem. Prod. Res. Develop., "Paving Asphalt", by R. M. Januszke, vol. 10, No. 2, (1971).

Primary Examiner—David Brunsman
Attorney, Agent, or Firm—Richard C. Willson, Jr.; Albert J. Adamcik

[57] ABSTRACT

Novel compositions comprising asphalt, having improved durability, are disclosed, the compositions comprising or containing (a) from about 0.1 percent to about 5.0 percent of a metal hydrocarbyldithiophosphate, or mixture thereof, and (b) from about 0.1 percent to about 5.0 percent of an antioxidant butylated phenol, or mixture thereof, the ratio of (a) to (b) being from about 0.75:1 to about 4.0:1. A process of making such improved compositions is also described, as well as methods of utilizing such compositions.

34 Claims, No Drawings

ASPHALT IMPROVEMENT

FIELD OF THE INVENTION

The invention relates to asphalt compositions and to the improvement of their properties. More particularly, the invention relates to novel modified asphalt compositions characterized by improved resistance to oxidation during aging and by reduced viscosity, and to a process for producing such novel asphalt compositions. The invention further relates to modified asphalt compositions useful in a variety of applications, particularly as paving asphalts, and to construction methods utilizing such compositions.

BACKGROUND OF THE INVENTION

Asphalt based materials are extensively used in a wide variety of applications. For example, asphaltic material is widely employed as a primary ingredient in coating compositions for structures, in sealants, and in waterproofing agents. Asphalt compositions have been used in paving mixtures with considerable advantage for many years. Many manufactured roofing materials, such as roofing shingles, impregnated felts, tars, mastics, and cements, are also based on asphalt and compositions thereof.

In the case of paving asphalts, a typical paving asphalt mixture comprises a mixture of components, principal ingredients of the paving asphalt mixture being an asphalt composition or cement and aggregate or aggregate material. In such mixtures, the ratio of asphalt composition to aggregate material varies, for example, according to aggregate material type and the nature of the asphalt composition. As used herein, the terms "asphalt composition" or "asphalt cement" are understood to refer to any of a variety of organic materials, solid or semi-solid at room temperature, which gradually liquefy when heated, and in which the predominant constituents are naturally occurring bitumens or residues commonly obtained in petroleum, synthetic petroleum, or shale oil refining, or from coal tar, or the like. For example, vacuum tower bottoms produced during the refining of conventional or synthetic petroleum oils is a common residue material useful as asphalt composition. A "paving asphalt composition" or "paving asphalt cement", accordingly, is an asphalt composition or asphalt cement having characteristics which dispose the composition to use as a paving material, as contrasted, for example, with an asphalt composition suited for use as a roofing material. "Roofing asphalts", for example, usually have a higher softening point, and are thus are more resistant to flow from heat on roofs, the higher softening point generally being imparted by the air blowing processes by which they are commonly produced. Paving asphalt mixtures may be formed and applied in a variety of ways, as well understood by those skilled in the art. For example, the paving asphalt composition and the aggregate can be mixed and applied at elevated temperatures at the fluid state of the paving asphalt composition to form the pavement or road surface.

Regardless of the particular manner of formation or application of the particular asphalt mixture, durability is an important matter in the case of most such materials. For instance, in the case of a paving asphalt composition, durability of the road surface is a primary concern. The degree and rate of hardening of the paving asphalt composition or cement during application and while in service (so-called "age hardening"), caused by an increase in viscosity of the asphalt mixture and gradual loss of flexibility, are factors affecting the durability of an applied surface. At least one worker in the art (i.e., Januschke, *Industrial Engineering Chemistry Product Research and Development*, Vol. 10, 1971, 209–213) has concluded that the reaction of the asphalt composition with atmospheric oxygen is the principal cause of asphalt hardening in pavement. Accordingly, the retardation of hardening by the use of antioxidants has been the object of extensive study. The promulgation of the Strategic Highway Research Program (SHRP) specifications has given further impetus to work on improvement of paving asphalt properties.

Notwithstanding the considerable previous efforts expended to provide asphalt compositions having improved oxidation resistance, or to provide a method of improving asphalt durability, there has remained a continuing need, particularly with paving asphalts, for improved compositions and methods. The invention addresses this need.

SUMMARY OF THE INVENTION

Accordingly, in one embodiment, the invention relates to a novel modified asphalt composition containing an oxidation inhibiting or a stabilizing amount of (a) a composition selected from metal hydrocarbyldithiophosphates, and mixtures thereof, and (b) a composition selected from antioxidant butylated phenols, and mixtures thereof, (a) and (b) being present in a specified ratio to each other, and to compositions containing such modified asphalts. Generally, the modified asphalt compositions of the invention comprise (a) from about 0.1 percent to about 5.0 percent of a composition selected from metal hydrocarbyldithiophosphates, and mixtures thereof, and (b) from about 0.1 to about 5.0 percent of a composition selected from antioxidant butylated phenols, and mixtures thereof, (a) and (b) being present in a specified ratio to each other. Unless indicated otherwise, all composition percentages given herein are by weight, based on the total weight of the composition. As indicated, the metal hydrocarbyldithiophosphate may be present as a mixture of such hydrocarbyldithiophosphates, including mixtures of such compositions where more than one metal and/or hydrocarbyldithiophosphate moiety are present. The hydrocarbyldithiophosphates (including mixtures) are preferably present in an amount of from about 0.1 percent to about 2.0 percent. The antioxidant butylated phenol, or mixture thereof, is preferably supplied in an amount of from about 0.1 percent to about 2.0 percent. All percents and ratios herein are by weight.

The invention, in a second embodiment, relates to a process or method of improving the durability or resistance to oxidation of an asphalt composition comprising blending with said asphalt composition, at a temperature sufficient to liquefy said asphalt composition, an oxidation inhibiting or stabilizing amount of a composition selected from metal hydrocarbyldithiophosphates, and mixtures thereof, and a composition selected from antioxidant butylated phenols, and mixtures thereof, in a specified ratio to each other, as described more fully hereinafter. Preferably, the components are added so that the asphalt composition comprises from about 0.1 to about 5.0 percent of a composition selected from metal hydrocarbyldithiophosphates, and mixtures thereof, and from about 0.1 percent to about 5.0 percent of a composition selected from antioxidant butylated phenols, and mixtures thereof, in a specified ratio to each other, as described more fully hereinafter. Most preferably, the metal hydrocarbyldithiophosphate component employed is a mixture of such dithiophosphates, and the hydrocarbyldithiophosphate component is supplied in an amount of from about 0.1 percent to about 2.0 percent. The antioxidant

3 butylated phenol is preferably supplied in a range of from about 0.1 percent to about 2.0 percent. In yet a third and most preferred embodiment, the invention relates to a novel oxidation resistant asphalt pavement or composition comprising an aggregate or aggregate material and from about 1.0 percent to about 10.0 percent of the novel modified asphalt composition described herein.

In more particular embodiments, the invention is directed to specific methods of application and compositions therefor, such as a novel roof composition.

DETAILED DESCRIPTION OF THE INVENTION

Any suitable asphalt composition or cement may be employed for producing the modified asphalt compositions of the invention. For example, industrial asphalts used for coatings, sealants, roofing materials, adhesives and other applications may be used. Paving grade asphalt compositions, however, are employed in the preferred embodiment of the invention. Asphalt compositions may be derived, as indicated, from any well known bituminous or asphaltic substance obtained from natural sources or derived from a number of sources such as petroleum, shale oil, coal tar, and the like, as well as mixtures of two or more of such materials. Typical of such asphalts are the straight run asphalts derived from the atmospheric, steam and/or vacuum distillation of crude oils, or those asphalts derived from solvent precipitation treatments of raw lubricating oils and their fractions. Also included are the thermal or "cracked" asphalts which are separated as cracker bottom residues from refinery cracking operations and the asphalts produced as byproducts in hydrorefining operations. A preferred asphalt is the vacuum tower bottoms that is produced during the refining of synthetic or petroleum oils. The asphalt may be treated or modified before use in the invention; so-called "blown" asphalts are preferred in roofing asphalt compositions according to the invention. As indicated, for paving applications, any suitable paving grade asphalt may be employed for the compositions of the invention. Such paving asphalt compositions are often referred to as viscosity or penetration grade asphalts, having original penetrations up to 400 as measured by ASTM method D5. Preferred asphalts are the normal paving asphalts such as AC2.5, AC5, AC10, AC20, AC30, and AC40, the AC in the title designating asphalt cement and the number indicating the viscosity at 60° C. in poises multiplied by 100.

The metal hydrocarbyldithiophosphates employed in the invention are known and comprise metal compounds considered to have the formula

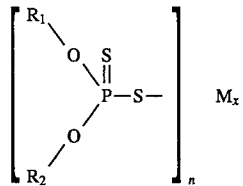

in which $R_1$ and $R_2$ are hydrocarbon or substantially hydrocarbon, M is the metal, x is 1 to 3, and n is 1 to 6. The metal is selected from barium, nickel calcium, strontium, zinc, and cadmium, copper, zinc, chromium, iron, cobalt, manganese, and antimony, with zinc being preferred. Suitable hydrocarbon moieties are low or medium molecular weight alkyl and alkylphenyl radicals, i.e., those containing from 1 to 30 carbon atoms in the hydrocarbon moiety, preferably 1

4 through 14 carbon atoms. For example, $R_1$ and $R_2$ may be independently selected from methyl, ethyl, isopropyl, isobutyl, n-butyl, sec-butyl, all amyl isomers, n-hexyl, cyclohexyl, methylisobutyl, heptyl, 2-ethylhexyl, ethylcyclohexyl, diisobutyl, isooctyl, nonyl, decyl, tetradecyl, octadecyl, eicosyl, etc. Suitable alkylphenyl moieties include, but are not limited thereto, butylphenyl, dibutylphenyl, amylphenyl, diamylphenyl, octylphenyl, butylnaphthyl, hexylnaphthyl, octylnaphthyl, etc. The term "substantially hydrocarbon" simply indicates that a given moiety contains an element other than hydrogen or carbon but is principally hydrocarbon in character. Suitable "substantially hydrocarbon" moieties include, but are not limited to, those containing from 1 to 30 carbon atoms, preferably 1 through 14 carbon atoms, such as chloroethyl, chloropentyl, dichlorophenyl, and dichlorodecyl.

Many of the metal hydrocarbyldithiophosphates are commercially available, at least in mixtures, or they may be prepared by well known methods. For example, a mixture of zinc $C_1$ - $C_{14}$ alkyldithiophosphates, designated LZ 1395, is commercially available from the Lubrizol Corporation. Alternately, the methods of preparation described in U.S. Pat. No. 3,673,231 or U.S. Pat. No. 5,015,402 may be employed.

Similarly, any antioxidant butylated phenol, or mixture thereof, may be employed. As used herein, the term "antioxidant butylated phenol" refers to a composition or compound which is a member of a class of phenols and diphenols, especially a grouping of tertiary butyl-substituted phenols and diphenols, whose phenolic structure is characterized by the presence of a butyl moiety, and which composition possesses antioxidant activity. For example, 2,6-di-tert-butylphenol, liquid mixtures of tertiary butylated phenols, 2,6-di-tert-butyl-4-methylphenol, 4,4'-methylene bis (2,6-di-tert-butylphenol), 2,2'-methylene bis (4 methyl-6-tert-butylphenol), mixed methylene bridged butylpolyalkyl phenols, 4,4-thiobis (2-methyl-6-tert-butylphenol), and mixtures thereof, may be used. The antioxidant butylated phenols are known materials, many of them being readily available commercially, or they may be produced by well known methods. For example, 2,6-di-tert-butylphenol and 4,4'-methylenebis (2,6-di-tert-butylphenol) are commercially available as products designated, respectively, as HiTEC 4701 and HiTEC 4702, from the Ethyl Corporation.

As indicated, the metal hydrocarbyldithiophosphate and antioxidant butylated phenol components are present in or supplied to the asphalt composition in an oxidation inhibiting amount or stabilizing amount, in appropriate ratio to each other. The metal hydrocarbyldithiophosphate compound or component will generally be present or added to the asphalt composition in a concentration of from about 0.1 percent to about 5.0 percent, preferably 0.1 percent to 2.0 percent, and the antioxidant butylated phenol or mixture thereof will normally be present in an amount of from about 0.1 percent to about 5.0 percent, preferably 0.1 percent to 2.0 percent. The ratio of the metal hydrocarbyldithiophosphate(s) to antioxidant butylated phenol(s) is important, and will range from about 0.75 to 1 to about 4.0 to 1, preferably from about 1.5 to 1 to about 3 or 4 to 1. The components may be combined first in the amounts required to achieve the desired stabilization, and then blended with the asphalt composition, or the individual additives may be blended directly, in the necessary concentrations, with the asphalt composition. Preferably, the modified asphalt compositions of the invention are prepared simply by blending the respective metal hydrocarbyldithiophosphate, or mixture thereof, and the antioxidant butylated phenol, or mixture thereof, with the asphalt composition which has been heated to a suitable temperature to liquefy the asphalt, agitation being provided to insure good mixing or distribution of the additives. Generally, temperatures of from 80° C. to 160° C. will suffice to liquefy or make fluid most asphalt compositions. If the additives of the invention are separately mixed, the hydrocarbyldithiophosphate(s) and the antioxidant butylated phenol(s) mixture is readily mixed with the asphalt chosen, utilizing a small amount of solvent, if desired, at a suitable elevated liquefying temperature, e.g., 80° C. to 160° C. Roofing surfaces are readily formed by preparing the asphalt composition according to the invention and applying it with or over, for example, one or more external layers of base material, i.e., to the surface of the base material not in contact with the roof structure but exposed to the environment, in the manner well known in the art. Suitable base materials include water impervious materials, i.e., materials at least substantially resistant to water penetration, even though some "breathing" may occur, such as asphalt-containing felt. So-called "built-up" roofs may include fine stone or aggregate to increase the durability of the roof surface and/or provide a more pleasing appearance. Pavement or road surfaces are readily formed according to the invention by mixing the paving asphalt composition of the invention as a liquid (e.g., by melting) with a suitable aggregate or aggregate material, or by melting asphalt, blending the additives of the invention therewith, mixing the aggregate therewith, distributing the aggregate-asphalt mixture, and compacting the distributed mixture. Gelled asphalt mixture also may be used, and the asphalts employed in all embodiments described herein may contain additives as are common in the art, such as polymeric materials, so long as they do not interfere significantly with the activity of the components of the invention. The aggregate mixture is laid and compacted according to practices well known in the art. The aggregate or aggregate material utilized in the pavement is a matter of choice within the ambit of those skilled in the art. As indicated, the mixing and application techniques used in pavement laying or manufacture are well known, as exemplified by the disclosure of U.S. Pat. No. 4,874,432.

In order to illustrate the invention, the following experiments were conducted with a paving grade asphalt.

I

A first volume of AC20 derived from a blend of Arabian Light, Kuwait, and Illinois Basin crudes was employed for the asphalt composition. A sample (A) was prepared by blending 3.25 g of a commercial grade (80 to 90 percent) zinc $C_1$ - $C_4$ alkyldithiophosphate in mineral oil (designated LZ-1395, and available from the Lubrizol Corporation) with 496.75 g of the asphalt composition, the blend being stirred and heated to about 163° C. (325° F.) for about 30 minutes. A second sample (B) was prepared by blending, in similar fashion, 4.25 g of a commercially available mixture (designated LZ-5178, and available from the Lubrizol Corporation) containing 50 to 60 percent zinc $C_1$ - $C_{14}$ alkyldithiophosphate and 20 to 30 percent butylated phenol, and 5 to 10 percent 2-ethylhexanol, with 495.75 g of the AC 20 asphalt composition. The properties of the samples were then each evaluated as blended (Initial), along with those of a control of the AC20, and then evaluated after the standardized rolling thin film oven test (RTFO) (AASHTO Method T-240) and the pressure aging vessel test (PAV) procedure (AASHTO Provisional Superpave PPI).

Further, a second volume of AC20 derived from a different blend of Arabian Light, Kuwait, and Illinois Basin crudes was obtained for additional asphalt compositions. A sample (C) was prepared by blending, with stirring and heating to about 250° C., 4.25 g of 2,6-di-tert-butylphenol (99.9 percent) (HiTEC 4701, from the Ethyl Corporation) with 495.75 g from this second volume. A sample (D) was prepared by blending, in similar fashion, 4.25 g of commercially available 4,4'methylenebis (2,6-di-tert-butyl phenol) (98 percent) (HiTEC 4702, from the Ethyl Corporation) with 495.75 g of the second volume asphalt composition. In the manner of the first two samples, the properties of samples (C) and (D) were evaluated initially, and then in the standardized rolling thin film oven test (RTFO) procedure and the pressure aging vessel test (PAV) procedure, along with those of a control. The results of the evaluations are compared in the following tables:

TABLE I

| | (Initial) | | |
|---|---|---|---|
| | AC20(1) control | A | B |
| 140° F. Vis. P | 1970 | 1907 | 1670.2 |
| 275° F. Vis., cSt | 430 | 410 | 415 |
| 77° F. Pen. | 70 | 72 | 77 |
| R&B Softening Point, °F. | 114 | 113 | 111 |
| DSR G*/(SIN DELTA)@58° C. | 2.432 | 2.416 | 2.179 |
| DSR G*/(SIN DELTA)@64° C. | 1.081 | 1.055 | 0.983 |

The results show immediate improvement in viscosity and 77° F. penetration by asphalt compositions of the invention over untreated paving asphalts and paving asphalt compositions containing zinc alkyldithiophosphate alone. The small quantity of the combination additive of the invention allows considerable lowering of the initial viscosity with a raising of penetration.

TABLE II

| | (Initial) | | | |
|---|---|---|---|---|
| | B | AC20(2) control | C | D |
| 140° F. Vis. P | 1670.2 | 2204.5 | 2096.9 | 1812 |
| 275° F. Vis., cSt | 415 | 444.3 | 441 | 402 |
| 77° F. Pen. | 77 | 66 | 67 | 77 |
| R&B Softening Point, °F. | 111 | 119 | 119.5 | 118 |
| DSR G*/(SIN DELTA)@58° C. | 2.179 | | 2.274 | 1.972 |
| DSR G*/(SIN DELTA)@64° C. | 0.983 | 1.491 | 1.000 | 0.9379 |
| DSR G*/(SIN DELTA)@70° C. | | 0.714 | 0.5441 | 0.4748 |

The results in Table II show that asphalt composition according to the invention exhibits initial viscosity reduction and penetration improvement comparable to asphalt compositions containing the specified butylated phenols alone.

TABLE III

| | (RFTO) | | |
|---|---|---|---|
| | AC20(1) control | A | B |
| 140° F. Vis. P | 4726 | 4506 | 3866 |
| Vis. Ratio | 2.4 | 2.36 | 2.32 |
| 275° F. Vis., cSt | 589 | 579 | 560.8 |
| 77° F. Pen. | 47 | 46 | 50 |
| R&B Softening Point, °F. | 122 | 123.5 | 122 |
| Wt. Loss/Gain | 0.0837 | −0.015 | 0.164 |
| DSR G*/(SIN DELTA)@58° C. | 5.656 | 4.783 | 4.404 |
| DSR G*/(SIN DELTA)@64° C. | 2.321 | 2.039 | 1.877 |

In the set of tests of Table III, the composition of the invention demonstrated excellent resistance to aging by controlled increase in viscosity and improved loss of penetration when compared with the untreated asphalt and asphalt composition containing zinc alkyldithiophosphate alone. Dynamic shear rheometer results show reduced effects of aging from lower G*/sin delta values.

TABLE IV

| | (RFTO) | | | |
|---|---|---|---|---|
| | B | AC20(2) control | C | D |
| 140° F. Vis. P | 3866 | 5666.8 | 5398.5 | 5888 |
| Vis. Ratio | 2.32 | 2.57 | 2.57 | 3.25 |
| 275° F. Vis., cSt | 560.8 | 658.8 | 651.5 | 645.9 |
| 77° F. Pen. | 50 | 41 | 38 | 34 |
| R&B Softening Point, °F. | 122 | 129 | 130 | 130 |
| Wt. Loss/Gain | 0.164 | 0.082 | 0.057 | −0.741 |
| DSR G*/(SIN DELTA)@58° C. | 4.404 | | 6.315 | 8.456 |
| DSR G*/(SIN DELTA)@64° C. | 1.877 | 3.201 | 2.83 | 3.456 |

Instead of the excellent resistance to increased viscosity from aging of the composition of the invention, asphalt composition containing 2,6-di-tert-butylphenol alone showed only modest improvement in viscosity control, while asphalt composition containing 4,4'methylenebis(2,6-di-tert butylphenol) actually showed an increase in viscosity. Dynamic shear rheometer results (G*/Sin Delta) indicate an increased stiffness upon aging as compared to the invention which demonstrated a reduction in stiffness.

TABLE V

| | (PAV) | | |
|---|---|---|---|
| | AC20(1) control | A | B |
| 140° F. Vis. P | 17222 | 15717 | 11135 |
| Vis. Ratio | 8.74 | 8.24 | 6.67 |
| 275° F. Vis., cSt | 960 | 888 | 851 |
| 77° F. Pen. | 28 | 30 | 34 |
| R&B Softening Point, °F. | 137 | 136 | 133 |

TABLE V-continued

| | (PAV) | | |
|---|---|---|---|
| | AC20(1) control | A | B |
| DSR G*/(SIN DELTA)@16° C. | | 5543 | 4736 |
| DSR G*/(SIN DELTA)@19° C. | 4877 | 4274 | 3503 |
| BBR Stiffness @−12° C. | 123 | 112 | 110 |
| BBR M-Value @−12° C. | 0.35 | 0.37 | 0.37 |
| BBR Stiffness @−18° C. | 258 | 252 | 242 |
| BBR M-Value @−18° C. | 0.29 | 0.3 | 0.3 |

In this set of tests, which simulate long term aging (i.e., 5–10 years) of the asphalt in the roadway, the composition of the invention demonstrated dramatic viscosity reduction and improved penetration when compared with the untreated asphalt and asphalt composition containing zinc alkyldithiophosphate alone. Moreover, the DSR G*(SIN DELTA) @16° C. and 19° C. of the composition of the invention showed great improvement. Further decreased stiffness and increased M-value results on the Bending Beam Rheometer(BBR) show the invention to have improved resistance to thermal cracking from reduced effects of aging.

TABLE VI

| | (PAV) | | | |
|---|---|---|---|---|
| | B | AC20(2) control | C | D |
| 140° F. Vis. P | 11135 | 23800 | 20642.9 | 19693.1 |
| Vis. Ratio | 6.67 | 10.79 | 9.84 | 10.87 |
| 275° F. Vis., cSt | 851 | 1142.4 | 1088.3 | 1078.7 |
| 77° F. Pen. | 34 | 24 | 23 | 17 |
| R&B Softening Point, °F. | 133 | 143 | 141 | 141 |
| DSR G*/(SIN DELTA)@16° C. | 4736 | 4913 | 6806 | 6437 |
| DSR G*/(SIN DELTA)@19° C. | 3503 | | 4902 | 4661 |
| DSR G*/(SIN DELTA)@22° C. | | 2903 | 3467 | 3243 |
| BBR Stiffness @−12° C. | 110 | 145 | 134.6 | 133.8 |
| BBR M-Value @−12° C. | 0.37 | 0.358 | 0.353 | 0.352 |
| BBR Stiffness @−18° C. | 242 | 340.3 | 335.9 | 339 |
| BBR M-Value @−18° C. | 0.3 | 0.297 | 0.303 | 0.306 |

Asphalt compositions containing the aforementioned butylated phenols alone showed only modest improvement in aging resistance. Viscosity increased considerably and their compositions actually show a loss in 77° F. penetration from aging. Moreover, their DSR G*(SIN DELTA) @22° C. showed an increase rather than a decrease and, correspondingly, a higher potential for fatigue failure. Accordingly, compositions according to the invention provide results not attainable by use of the individual components.

What is claimed is:

1. A composition comprising an asphalt composition containing an oxidation inhibiting amount of (a) a metal hydrocarbyldithiophosphate, or mixture thereof, and (b) an antioxidant butylated phenol, or mixture thereof, the ratio of (a) to (b) being from about 0.75:1 to about 4.0:1.

2. The composition of claim 1 wherein the ratio of (a) to (b) is from about 1.5:1 to about 4.0:1.

3. A process for improving the durability of an asphalt composition comprising blending with said asphalt composition, at a temperature sufficient to liquefy said paving asphalt composition, an oxidation inhibiting amount of (a) a metal hydrocarbyldithiophosphate, or mixture thereof, and (b) an antioxidant butylated phenol, or mixture thereof, the ratio of the Group II metal hydrocarbyldithiophosphate, or mixture thereof, to the antioxidant butylated phenol, or mixture thereof, being from about 0.75:1 to about 4.0:1.

4. The process of claim 3 wherein the ratio of the metal hydrocarbyldithiophosphate, or mixture thereof, to the antioxidant butylated phenol, or mixture thereof, is from about 1.5:1 to about 4.0:1.

5. A composition comprising an asphalt composition containing (a) from about 0.1 percent to about 5.0 percent of a composition selected from metal hydrocarbyldithiophosphates, and mixtures thereof, and (b) from about 0.1 percent to about 5.0 percent of a composition selected from antioxidant butylated phenols, and mixtures thereof, the ratio of (a) to (b) being from about 0.75:1 to about 4.0:1.

6. The composition of claim 5 wherein the ratio of (a) to (b) is from about 1.5:1 to about 4.0:1.

7. The composition of claim 5 wherein the metal is selected from zinc, calcium, copper, barium, nickel, chromium, iron, cobalt, manganese, strontium, cadmium and antimony, and mixtures thereof.

8. The composition of claim 5 wherein the metal is selected from zinc, calcium, copper, cobalt, and antimony, and mixtures thereof.

9. The composition of claim 5 wherein the metal is zinc.

10. A pavement composition comprising aggregate and from about 1.0 percent to about 10.0 percent of a paving asphalt composition containing an oxidation inhibiting amount of (a) a metal hydrocarbyldithiophosphate, or mixture thereof, and (b) an antioxidant butylated phenol, or mixture thereof, the ratio of (a) to (b) being from about 0.75:1 to about 4.0:1.

11. The composition of claim 10 wherein the ratio of (a) to (b) is from about 1.5:1 to about 4.0:1.

12. The pavement composition of claim 10 wherein the metal is selected from zinc, calcium, copper, barium, nickel, chromium, iron, cobalt, manganese, strontium, cadmium, and antimony, and mixtures thereof.

13. The pavement composition of claim 10 wherein the metal is selected from zinc, calcium, copper, cobalt, and antimony, and mixtures thereof.

14. The pavement composition of claim 10 wherein the metal is zinc.

15. A process for improving the durability of an asphalt composition comprising blending with said asphalt composition, at a temperature sufficient to liquefy said asphalt composition, from about 0.1 percent to about 5.0 percent of a composition selected from metal hydrocarbyldithiophosphates, and mixtures thereof, and from about 0.1 percent to about 5.0 percent of a composition selected from antioxidant butylated phenols, and mixtures thereof, the ratio of the metal hydrocarbyldithiophosphate, or mixture thereof, to the antioxidant butylated phenol, or mixture thereof, being from about 0.75:1 to about 4.0:1.

16. The process of claim 9 wherein the ratio of the metal hydrocarbyldithiophosphate, or mixture thereof, to the antioxidant butylated phenol, or mixture thereof, is from about 1.5:1 to about 4.0:1.

17. The process of claim 16 wherein the metal is selected from zinc, calcium, copper, barium, nickel, chromium, iron, cobalt, manganese, and antimony, and mixtures thereof.

18. The process of claim 16 wherein the metal is selected from zinc, calcium, copper, cobalt, strontium, cadmium, and antimony, and mixtures thereof.

19. The process of claim 16 wherein the metal is zinc.

20. An asphalt composition containing an oxidation inhibiting amount of (a) a metal hydrocarbyldithiophosphate, or mixture thereof, and (b) an antioxidant butylated phenol, or mixture thereof, the ratio of (a) to (b) being from about 0.75:1 to about 4.0:1.

21. An asphalt composition containing (a) from about 0.1 percent to about 5.0 percent of a metal hydrocarbyldithiophosphate, or mixture thereof, and (b) from about 0.1 percent to about 5.0 percent of an antioxidant butylated phenol, or mixture thereof, the ratio of (a) to (b) being from about 0.75:1 to about 4.0:1.

22. The composition of claim 21 wherein the ratio of (a) to (b) is from about 1.5:1 to about 4.0:1.

23. An asphalt composition containing (a) from about 0.1 percent to about 2.0 percent of a metal hydrocarbyldithiophosphate, or mixture thereof, and (b) from about 0.1 percent to about 2.0 percent of an antioxidant butylated phenol, or mixture thereof, the ratio of (a) to (b) being from about 1.5:1 to about 4.0:1.

24. A process for improving the durability of a paving asphalt composition comprising blending with said asphalt composition, at a temperature sufficient to liquefy said paving asphalt composition, from about 0.1 percent to about 2.0 percent of a metal hydrocarbyldithiophosphate, or mixture thereof, and from about 0.1 percent to about 2.0 percent of an antioxidant butylated phenol, or mixture thereof, the ratio of said hydrocarbyldithiophosphate to said antioxidant phenol being from about 0.75:1 to about 4.0:1.

25. The process of claim 24 wherein the ratio of the metal hydrocarbyldithiophosphate, or mixture thereof, to the antioxidant butylated phenol, or mixture thereof, is from about 1.5:1 to about 4.0:1.

26. A pavement composition comprising aggregate and from about 1.0 percent to about 10.0 percent of a paving asphalt composition containing (a) from about 0.1 percent to about 5.0 percent of a composition selected from metal hydrocarbyldithiophosphates, or mixtures thereof, and (b) from about 0.1 percent to about 5.0 percent of a composition selected from antioxidant butylated phenols, or mixtures thereof, the ratio of (a) to (b) being from about 0.75:1 to about 4.0.:1.

27. The composition of claim 26 wherein the ratio of (a) to (b) is from about 1.5:1 to about 4.0:1.

28. A method for paving comprising
   heating paving asphalt sufficiently to liquefy said paving asphalt, and forming liquefied paving asphalt;
   blending with said liquefied paving asphalt (a) from about 0.1 percent to about 5.0 percent of a composition selected from metal hydrocarbyldithiophosphates, and mixtures thereof, and (b) from about 0.1 percent to about 5.0 percent of a composition selected from antioxidant butylated phenols, and mixtures thereof, the ratio of (a) to (b) being from about 0.75:1 to about 4.0:1, forming a liquefied modified paving asphalt;
   mixing aggregate with said liquefied modified paving asphalt to form an aggregate-modified asphalt paving mixture;
   distributing aggregate-modified asphalt paving mixture over a surface to be paved; and
   compacting distributed aggregate-modified asphalt paving mixture to the desired density to produce a laydown of asphalt concrete.

29. A method for paving comprising heating a modified paving asphalt containing (a) from about 0.1 percent to about 5.0 percent of a composition selected from Group II metal hydrocarbyldithiophosphates, and mixtures thereof, and (b) from about 0.1 percent to about 5.0 percent of a composition selected from antioxidant butylated phenols, and mixtures thereof, the ratio of (a) to (b) being from about 0.75:1 to about 4.0:1, sufficiently to liquefy said paving asphalt, and forming liquefied modified paving asphalt;

mixing aggregate with liquefied modified paving asphalt to form an aggregate-modified asphalt paving mixture;

distributing aggregate-modified asphalt paving mixture over a surface to be paved; and compacting distributed aggregate-modified asphalt paving mixture to the desired density to produce a laydown of asphalt concrete.

30. A method for paving comprising forming a gel of a liquefied modified paving asphalt containing (a) from about 0.1 percent to about 5.0 percent of a composition selected from metal hydrocarbyldithiophosphates, and mixtures thereof, and (b) from about 0.1 percent to about 5.0 percent of a composition selected from antioxidant butylated phenols, and mixtures thereof, the ratio of (a) to (b) being from about 0.75:1 to about 4.0:1;

removing water of reaction from the gel, forming substantially water-free gelled modified paving asphalt;

mixing aggregate with gelled liquefied modified paving asphalt to form an aggregate-modified asphalt paving mixture;

distributing aggregate-modified asphalt paving mixture over a surface to be paved; and compacting distributed aggregate-modified asphalt paving mixture to the desired density to produce a laydown of asphalt concrete.

31. A roofing composition comprising one or more layers of a water impervious material;

and at least one layer of a roofing asphalt containing (a) from about 0.1 percent to about 5.0 percent of metal hydrocarbyldithiophosphate, or mixture thereof, and (b) from about 0.1 percent to about 5.0 percent of an antioxidant butylated phenol, or mixture thereof, the ratio of (a) to (b) being from about 0.75:1 to about 4.0:1, applied to said water impervious material.

32. The roofing composition of claim 31 wherein the water impervious material is asphalt-containing felt.

33. A method of roofing comprising applying one or more layers of a water impervious material to an external roof surface;

distributing at least one layer of a roofing asphalt containing (a) from about 0.1 percent to about 5.0 percent of a composition selected from metal hydrocarbyldithiophosphates, and mixtures thereof, and (b) from about 0.1 percent to about 5.0 percent of a composition selected from antioxidant butylated phenols, and mixtures thereof, the ratio of (a) to (b) being from about 0.75:1 to about 4.0:1, to the surface of the water impervious material not in contact with the external roof surface.

34. The method of claim 33 wherein the water impervious material is asphalt-containing felt.

\* \* \* \* \*